UNITED STATES PATENT OFFICE.

PAUL FISCHER, OF ELBERFELD, GERMANY, ASSIGNOR TO FARBENFABRIKEN VORM. FRIEDR. BAYER & CO., OF ELBERFELD, GERMANY, A CORPORATION OF GERMANY.

YELLOW DYE.

938,566.   Specification of Letters Patent.   Patented Nov. 2, 1909.

No Drawing.   Application filed April 14, 1909.   Serial No. 489,786.

*To all whom it may concern:*

Be it known that I, PAUL FISCHER, doctor of philosophy, chemist, citizen of the German Empire, residing at Elberfeld, Germany, have invented new and useful Improvements in Yellow Dye, of which the following is a specification.

My invention relates to the production of new anthracene derivatives. They are obtained by condensing succinic acid with an aminoanthraquinone, one molecule of the acid entering into combination with two molecules of an aminoanthraquinone. The operation can also be conducted in such manner that one molecule of the acid is combined first with one molecule of an aminoanthraquinone and the intermediate compound thus obtained is then condensed with a second molecule of an aminoanthraquinone. The reaction may be accelerated by the addition of suitable condensing agents, e. g. $PCl_5$. $ZnCl_2$, boric acid, acid chlorids, acid anhydrids or the like. The new products are after being dried and pulverized colored powders practically insoluble in water and in the usual organic solvents and soluble in concentrated sulfuric acid with from a yellow to red color. They yield on treatment with hydrosulfite and caustic soda lye from yellow to red vats suitable for dyeing and printing cotton from yellow to violet to brown shades.

In order to illustrate the new process more fully the following examples are given, the parts being by weight:

Example A: A mixture of 22 parts of 1-aminoanthraquinone, 12 parts of succinic acid and 100 parts of nitrobenzene is heated to boiling for 6 to 8 hours until the 1-aminoanthraquinone has disappeared. After cooling the new condensation product is filtered off. It is after being dried and pulverized a yellow powder practically insoluble in water and in the usual organic solvents; it is soluble in concentrated sulfuric acid with a yellow color. By treatment with reducing agents, e. g. hydrosulfite and NaOH a yellowish-red vat is obtained dyeing cotton beautiful yellow shades. The same product is obtained by heating a mixture, while it is well stirred, of 22 parts of 1-aminoanthraquinone and 12 parts of succinic acid to 220–230° C. for 5–6 hours.

Example B: 22 parts of 1-aminoanthraquinone are heated to 180° C. for one hour with 24 parts of succinic acid and 100 parts of nitrobenzene. After cooling the condensation product of one molecule of aminoanthraquinone with one molecule of succinic acid is filtered off and washed with alcohol. It can be obtained in a pure state by treating the raw material with ammonia and acidulating the ammoniacal solution. It dissolves in organic solvents and in alkalies with a yellow to yellowish-red color. 15 parts of this product are then heated to 120° C. for 5–6 hours with 11 parts of 2-aminoanthraquinone, 160 parts of nitrobenzene and 5 parts of phosphorous pentachlorid. After cooling the condensation product is filtered off with suction and washed with nitrobenzene and alcohol. It is a yellow crystalline powder, scarcely soluble in organic solvents. By treatment with reducing agents it yields a red vat dyeing cotton yellowish-red shades which turn pure yellow on oxidation by the air. Another aminoanthraquinone may be used e. g. 1.5-diaminoanthraquinone, 1.4-diaminoanthraquinone, 1-chloro-5-aminoanthraquinone, 1-chloro-4-aminoanthraquinone, 1-amino-4-oxyanthraquinone, 1-nitro-4-aminoanthraquinone, 1-amino-4-methoxyanthraquinone, 1-amino-4-methylaminoanthraquinone, 1-nitro-5-aminoanthraquinone, 1-amino-5-methylaminoanthraquinone, 1-amino-5-tolyl-aminoanthraquinone, 1.8-diaminoanthraquinone, 1.4-aminomethylanthrapyridone etc.

In order to illustrate the method of dyeing in the "vat" prepared from my coloring matters obtainable by the new process the following example is given, the parts being by weight:—

Example C: Mix while stirring 20 parts of a 10 per cent. paste of the condensation product obtained from succinic acid and two molecules of 1-aminoanthraquinone with 300 parts of water, add 50 parts of a solution of hydrosulfite of 20° Bé. and 4–5 parts of caustic soda lye (30 per cent. of NaOH) and heat the resulting mixture to 50° C. Enter 100 parts of cotton and dye in the "vat" for ¾ hour. Remove the goods, rinse and soap hot. A very fast yellow shade is thus obtained. The process of dyeing is carried out in the same way on using other of the above mentioned dyestuffs. Yellow, orange, red, violet, brown shades may thus be obtained. The dyestuffs are used in an analogous way for printing from suitably thickened vats.

I claim:—

1. The herein described new vat dyestuffs of the anthracene series which can be obtained by condensing one molecule of succinic acid with two molecules of an aminoanthraquinone, which dyestuffs are, after being dried and pulverized, colored powders practically insoluble in water and in the usual organic solvents, soluble in concentrated sulfuric acid with a yellow to red color; giving from yellow to red vats with hydrosulfite and caustic soda lye, which vats dye unmordanted cotton from yellow to violet to brown shades, substantially as described.

2. The herein described new vat dyestuff of the anthracene series which can be obtained by condensing succinic acid with 1-aminoanthraquinone, which dyestuff is, after being dried and pulverized, a yellow powder which is practically insoluble in water and in the usual organic solvents; soluble in concentrated sulfuric acid with a yellow color; giving a yellowish-red vat with hydrosulfite and caustic soda lye, which vat dyes cotton beautiful yellow shades, substantially as described.

In testimony whereof I have hereunto set my hand in the presence of two subscribing witnesses.

PAUL FISCHER. [L. S.]

Witnesses:
OTTO KÖNIG,
C. J. WRIGHT.